United States Patent
Lambert et al.

(10) Patent No.: US 10,298,386 B1
(45) Date of Patent: May 21, 2019

(54) METHOD AND APPARATUS FOR SECURE COMMUNICATIONS IN NETWORKS

(71) Applicant: MARVELL INTERNATIONAL LTD., Hamilton (BM)

(72) Inventors: Paul A. Lambert, Mountain View, CA (US); Yong Liu, Campbell, CA (US); Raja Banerjea, Sunnyvale, CA (US); Harish Ramamurthy, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/202,210

(22) Filed: Jul. 5, 2016

Related U.S. Application Data

(62) Division of application No. 12/822,172, filed on Jun. 23, 2010, now abandoned.

(60) Provisional application No. 61/220,710, filed on Jun. 26, 2009, provisional application No. 61/220,746, filed on Jun. 26, 2009, provisional application No. 61/223,333, filed on Jul. 6, 2009.

(51) Int. Cl.
*H04L 9/06* (2006.01)
*H04L 9/32* (2006.01)

(52) U.S. Cl.
CPC ............ *H04L 9/065* (2013.01); *H04L 9/3271* (2013.01)

(58) Field of Classification Search
CPC .............................. H04L 9/065; H04L 9/3271
See application file for complete search history.

(56) References Cited

U.S. PATENT DOCUMENTS

| | | | |
|---|---|---|---|
| 6,725,222 B1 | 4/2004 | Musgrove et al. | |
| 6,915,437 B2 | 7/2005 | Swander et al. | |
| 6,917,685 B1 | 7/2005 | Watanabe et al. | |
| 6,948,074 B1 | 9/2005 | Borella et al. | |
| 7,676,838 B2 | 3/2010 | Choyi et al. | |
| 2003/0041265 A1 | 2/2003 | Lagimonier et al. | |
| 2004/0049676 A1 | 3/2004 | Dutertre et al. | |
| 2005/0004937 A1 | 1/2005 | Colarik | |
| 2008/0046039 A1 | 2/2008 | Corndorf | |
| 2009/0172394 A1* | 7/2009 | Johnston | H04W 12/04 713/160 |
| 2009/0235066 A1* | 9/2009 | Ptasinski | H04L 63/123 713/150 |
| 2011/0055558 A1* | 3/2011 | Liu | H04L 9/0637 713/160 |
| 2012/0177199 A1* | 7/2012 | Baek | H04L 63/0428 380/270 |

(Continued)

FOREIGN PATENT DOCUMENTS

WO    WO 2012033379 A2 *   3/2012  ............... H04L 9/32

OTHER PUBLICATIONS

"CCMP AES Encryption", 2003, Vocal Technologies, p. 1-4.*

(Continued)

*Primary Examiner* — Robert B Leung
*Assistant Examiner* — Thomas Ho

(57) ABSTRACT

An unencrypted media access control layer (MAC) protocol data unit (MPDU) having a header is received at a wireless network interface device. The header includes a sequence number. The wireless network interface device uses the sequence number to encrypt data in the unencrypted MPDU to generate an encrypted MPDU, and transmits the encrypted MPDU.

5 Claims, 8 Drawing Sheets

(56) References Cited

U.S. PATENT DOCUMENTS

2012/0281623 A1   11/2012   Rautiola et al.
2015/0289164 A1*  10/2015   Seok .................. H04W 84/12
                                                   370/311

OTHER PUBLICATIONS 802.11 MAC Header Breakdown, Dec. 3, 2014, https://community.arubanetworks.com/t5/Technology-Blog/802-11-MAC-Header-Breakdown/ba-p/219264.*

IEEE P802.11n™ D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11e/D11.0, "IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements," *The Institute of Electrical and Electronics Engineers, Inc.*, pp. 1-196 (Oct. 2004).

IEEE Std 802.11e/D13.0, "IEEE Standard for Information technology—Telecommunications and information exchange between systems—Local and metropolitan area networks—Specific requirements, Part 11: Wireless LAN Medium Access Control (MAC) and Physical Layer (PHY) Specifications: Amendment: Medium Access Control (MAC) Quality of Service (QoS) Enhancements," *The Institute of Electrical and Electronics Engineers, Inc.*, 204 pages (Jan. 2005).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, "*The Institute of Electrical and Electronics Engineers, Inc.*, pp. 1-69 (Apr. 2003).

IEEE Std 802.11i-2004, "IEEE Standard for Information technology—Telecommunications and information exchange between systems—Local and metropolitan area networks—Specific requirements, Part 11: Wireless LAN Medium Access Control (MAC) and Physical Layer (PHY) Specifications: Amendment 6: Medium Access Control (MAC) Security Enhancements," The Institute of Electrical and Electronics Engineers, Inc., 190 pages (Jul. 2004).

IEEE Std 802.11i/D3.0, "Draft Supplement to Standard for Telecommunications and Information Exchange Between Systems—LAN/MAN Specific Requirements—Part 11: Wireless Medium Access Control (MAC) and Physical Layer (PHY) Specifications: Specification for Enhanced Security," The Institute of Electrical and Electronics Engineers, Inc., Nov. 2002.

IEEE Std. 802.11 n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

Chen, "Home Network Basis: Transmission Environments and Wired/Wireless Protocols," Prentice Hall, pp. 1-26 (Jul. 2003).

Gopinath et al., "Hooray, 802.11w is Ratified . . . So, What Does it Mean for Your WLAN? A Brief Tutorial on IEEE 802.11w," AirTight Networks, Inc., pp. 1-14 (2009).

Gunnam et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648. (2007).

Harkins, "IEEE P802.11, Wireless LANs, Definition of the GCMP Ciphersuite," The Institute of Electrical and Electronics Engineers, Inc., doc.: IEEE 802.11-09/1112r0, pp. 1-8 (Nov. 2009).

Hiertz et al., "The IEEE 802.11 Universe," *IEEE Communications Magazine*, pp. 62-70, (Jan. 2010).

Mujtaba, "IEEE P802.11—Wireless LANs, TGn Sync Proposal Technical Specification," *The Institute of Electrical and Electronics Engineers, Inc.*, doc.: IEEE 802.11—04/0889r6, pp. 1-131 (May 2005).

Van Nee et al. "The 802.11n MIMO-OFDM Standard for Wireless LAN and Beyond," Wireless Personal Communications, vol. 37, pp. 445-453 (Jun. 2006).

U.S. Appl. No. 12/822,172, Lambert et al., "Integrated Security Mechanism for Use in Communication Networks," filed Jun. 23, 2010.

* cited by examiner

METHOD AND APPARATUS FOR SECURE COMMUNICATIONS IN NETWORKS

CROSS-REFERENCES TO RELATED APPLICATIONS

This application is a divisional of U.S. patent application Ser. No. 12/822,172, filed on Jun. 23, 2010, entitled "INTEGRATED SECURITY MECHANISM FOR USE IN COMMUNICATION NETWORKS," which claims the benefit of U.S. Provisional Patent Application No. 61/220,710, entitled "ENHANCED WIRELESS SEQUENCE NUMBER PROCESSING," filed on Jun. 26, 2009, U.S. Provisional Patent Application No. 61/220,746, entitled "ENHANCED WIRELESS SEQUENCE NUMBER PROCESSING," filed on Jun. 26, 2009, and U.S. Provisional Patent Application No. 61/223,333, entitled "ENHANCED WIRELESS SEQUENCE NUMBER PROCESSING," filed on Jul. 6, 2009. The entire disclosures of all of the above-referenced patent applications are hereby incorporated by reference herein in their entireties.

FIELD OF TECHNOLOGY

The present disclosure relates generally to communication networks and, more particularly, to integrated security mechanism in communication networks.

BACKGROUND

The background description provided herein is for the purpose of generally presenting the context of the disclosure. Work of the presently named inventors, to the extent it is described in this background section, as well as aspects of the description that may not otherwise quality as prior art at the time of filing, are neither expressly nor impliedly admitted as prior art against the present disclosure.

Communication devices and systems, in order to communicate information, utilize communication protocols and standards that specify the manner in which information is to be communicated. For example, some protocols that are used for wireless communication are described in detail in the IEEE 802.11 Standards, including for example, the IEEE 802.11a (1999) Standard and its updates and amendments, the IEEE 802.11g (2003) Standard, as well as the IEEE 802.11e, the IEEE 802.11i, the IEEE 802.11n and the IEEE 802.11w Standards, all of which are collectively incorporated herein fully by reference.

One commonality among IEEE 802.11 Standards and other standards that describe communication protocols is that these standards specify formats for various information units (e.g., packets, frames, data units, datagrams, and so on) that may be used for packaging and communicating information between communication devices and systems. Generally, these information units include the actual information, or a portion thereof, that is intended to be communicated between communication devices and systems (often referred to as "payload information") and/or supplemental information (often referred to as "overhead information" or "header information") that is used for controlling the communication of the payload information. Some examples of overhead information include information used to provide flow control, congestion control, error control, security, and so on.

Generally, with the increase in the amount of overhead information, additional mechanisms are provided for controlling the communication of the payload information. As a result, an increase in overhead information may result in an improved accuracy of the communication. However, an increase in the amount of overhead information may also result in less payload information transmitted in a given time, possibly yielding lower throughput rates. Moreover, in order to process the additional overhead information, more sophisticated and/or expensive processing components may be required. Therefore, it is generally desired to balance these and other factors affected by the amount of overhead information by optimizing the amount of overhead information to achieve both suitable integrity of the communicated information and the efficiency of the communication.

SUMMARY

The present disclosure provides various embodiments of an integrated security mechanism for use in communication networks.

In one embodiment, a method includes: receiving, at a wireless network interface device, an unencrypted media access control layer (MAC) protocol data unit (MPDU) having a header, wherein the header includes a sequence number; using, at the wireless network interface device, the sequence number to encrypt data in the unencrypted MPDU to generate an encrypted MPDU; and transmitting, with the wireless network interface device, the encrypted MPDU.

In another embodiment, an apparatus comprises circuitry configured to: receive an unencrypted MPDU having a header, wherein the header includes a sequence number; use the sequence number to encrypt data in the unencrypted MPDU to generate an encrypted MPDU; and cause a wireless network interface device to transmit the encrypted MPDU.

In yet another embodiment, a method of processing information at a transmitting station includes encrypting at least some data in an unencrypted information unit to generate an encrypted information unit. The method further includes determining a single integrated information unit identifier for the encrypted information unit, where the single integrated information unit identifier identifies the encrypted information unit. The method further includes adding the determined single integrated information unit identifier to the encrypted information unit. The method further includes transmitting the encrypted information unit to a receiving station. Transmitting the encrypted information unit to a receiving station includes providing the single integrated information unit identifier to the receiving station to enable the receiving station to decrypt the encrypted information unit. Transmitting the encrypted information unit to a receiving station further includes using the single integrated information unit identifier to control transmission of the encrypted information unit.

In still another embodiment, a method of processing information at a communication device includes receiving an encrypted information unit, where the encrypted information unit includes a single integrated information unit identifier that identifies the received encrypted information unit. The method further includes using the single integrated information unit identifier to authenticate the received encrypted information unit. The method further includes using the single integrated information unit identifier for a non-authentication purpose to process the received encrypted information unit.

In yet another embodiment, an apparatus for processing information includes an information unit encryption engine configured to encrypt at least some data in an unencrypted information unit to generate an encrypted information unit.

The apparatus further includes a security information generator to (i) determine a single integrated information unit identifier for the encrypted information unit and (ii) add the determined single integrated information unit identifier to the encrypted information unit. The single integrated information unit identifier identifies the encrypted information unit. The apparatus further includes a communication engine to transmit the encrypted information unit to a receiving station. The communication engine is configured to provide the single integrated information unit identifier to the receiving station to enable the receiving station to decrypt the encrypted information unit. The communication engine is further configured to use the single integrated information unit identifier to control transmission of the encrypted information unit.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

System Overview

Figure 1:
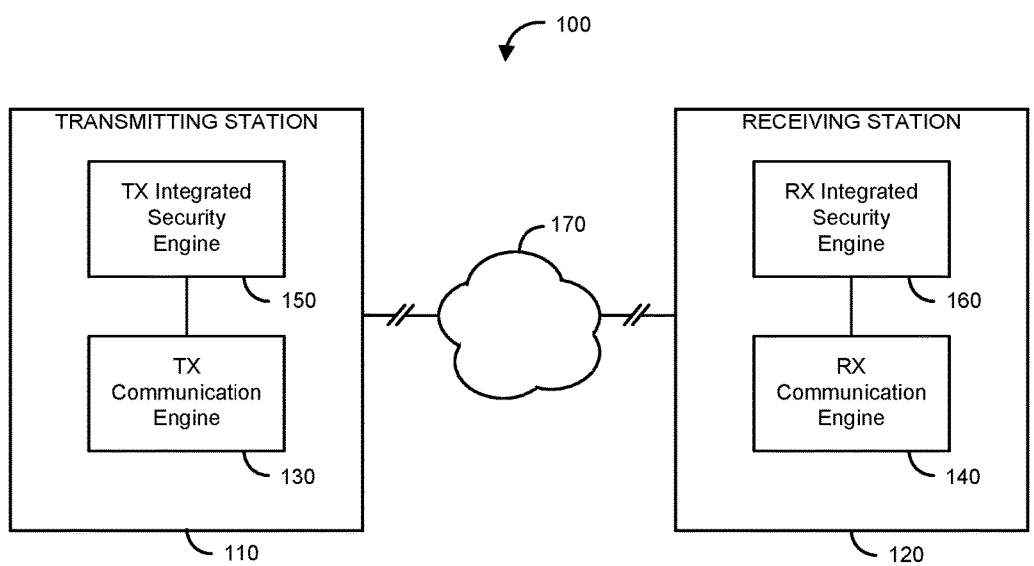
FIG. 1 is a block diagram illustrating an example communication system that includes integrated security capabilities, according to an embodiment.

FIG. 1 is a block diagram of an example communication system 100 (e.g., a wireless communication system) that includes integrated security capabilities, according to an embodiment. The example communication system 100 includes a number of stations 110, 120, such as transmitting (TX) stations 110 and receiving (RX) stations 120, communicatively coupled via a network 170 that facilitates communication of information between the stations 110, 120. In order to transmit information, a transmitting station 110 includes a TX communication engine 130 that generally forms that information into one or more information units and transmits those information units to the receiving station 120 via the network 170. In order to receive and process the information transmitted by the transmitting station 110, the receiving station 120 includes and RX communication engine 140 that generally receives and processes that transmitted information units. Additionally, in order to enable secure communications between the transmitting station 110 and the receiving station 120, the transmitting station 110 and the receiving station 120 include a TX integrated security engine 150 and an RX integrated security engine 120, respectively, that provide the transmitting station 110 and the receiving station 120 with integrated security capabilities. Details of integrated security capabilities, embodiments of the TX integrated security engine 150 and the RX integrated security engine 160 are described below.

For ease of explanation, example integrated security mechanisms will be described in the in the context of Layer 2 (also known as the "Data Link Layer") of the Open System Interconnection Reference Model ("OSI Model") of computer networking. However, it will be understood that the stations 110, 120, as well as the present disclosure in general, are not limited to any particular layer of the OSI Model. Therefore, terms and phrases that are typically associated with Layer 2 of the OSI Model, when used herein, should not be understood as limiting the scope of the present disclosure to the Data Link Layer. For example, although Media Access Control (MAC) Service Data Units (MSDUs) and MAC Protocol Data Unites (MPDUs) will be used as example information units involved with integrated security capabilities, it will be understood that other types of information units may be used, including information units that are not associated with Layer 2 of the OSI Model (e.g., packets, messages, and so on).

Furthermore, it will be understood that the present disclosure is not limited to any particular topology of the network 170, or to any particular function or placement of the stations 110, 120 in the network. For example, the stations 110, 120 may be located at the edge of the communication system 100, or they may be intermediate network devices that are part of the network backbone interconnecting different networks. Stations 110, 120 may be end hosts (e.g., personal computers, laptops, printers, copier systems, scanners, personal digital assistants (PDAs), mobile phones, smart phones, fax machines, and so on) or intermediate network devices (e.g., bridges, routers, hubs, firewalls, proxies, and so on). Furthermore, although, for ease of explanation, FIG. 1 illustrates a single transmitting station 110 and a single receiving station 120, it will be understood that the example integrated security mechanisms may be utilized in communication systems that include any number of transmitting stations 110, receiving stations 120, or other stations that, for example, may be capable of both transmitting and receiving information.

Conventional Security Mechanisms

Before discussing the details of the integrated security mechanisms, conventional security mechanisms implemented by conventional transmitting stations and receiving stations are discussed. Examples of conventional security mechanisms include mechanisms, or modes, associated with the Advanced Encryption Standard (AES), including the Counter Mode with Cipher Block Chaining Message Authentication Code Protocol (CCMP), the Galois/Counter Mode (GCM), and the Counter with Cipher Block Chaining Message Authentication Code (CCM).

Figure 2:
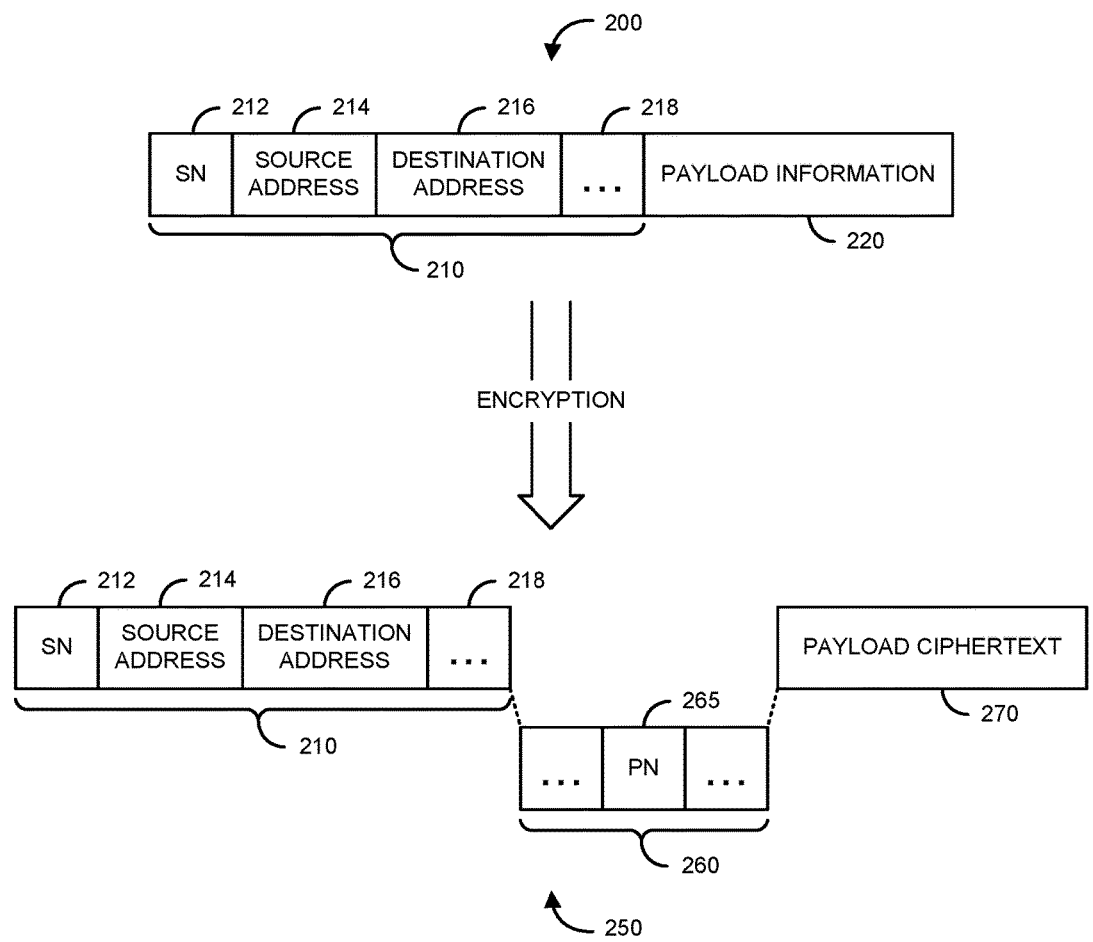
FIG. 2 is a block diagram illustrating a format of a typical unencrypted information unit and a format of a conventional encrypted information unit that results from encryption using conventional security mechanisms.

FIG. 2 is a block diagram of a format of a typical unencrypted information unit 200 and a format of a typical encrypted information unit 250 that results from encryption using a conventional security mechanism, such as AES-CCMP. The conventional unencrypted information unit 200 and the conventional encrypted information unit 250 are frames such as MPDUs, MSDUs, or a combination thereof. Generally, a difference between MSDUs and MPDUs is that MSDUs operate on a higher protocol layer. For example, MSDUs are communicated between a station's operating system and the MAC layer, whereas MPDUs are communicated between the MAC layer and the station's antenna, in an embodiment. An MPDU encapsulates an MSDU, or an MSDU is sometimes fragmented into multiple MPDUs and reassembled back into a single MSDU. More details regarding the relationship between MSDUs and MPDUs can be found in the IEEE 802.11 Standards.

As illustrated in FIG. 2, the conventional unencrypted information unit 200 includes payload information 220 and a MAC header 210. The MAC header 210 includes a source address 214 specifying a source of the unencrypted information unit 200 (e.g., the transmitting station), a destination address 216 specifying a destination of the conventional unencrypted information unit 200 (e.g., the receiving station), and other information 218 that is described, for example in the IEEE 802.11 Standards. Additionally, the MAC header 210 of the conventional unencrypted information unit 200 includes a unique, or a quasi-unique sequence number (SN) field 212 that includes a sequence number (SN) that uniquely, or quasi-uniquely, identifies the conventional unencrypted information unit 200. As described in the IEEE 802.11 Standards, the SN is a 12-bit sequence number, and a transmitting station assigns a new SN to every new information unit. In order to provide uniqueness, or quasi-uniqueness, the transmitting station maintains a 12-bit counter and monotonically increments the 12-bit counter with each new SN (corresponding to a new transmission). Thus, the transmitting station has the capability of providing $2^{12}$=4096 unique sequence numbers for the SN field 212, and once all of the 4096 unique SNs are used, the counter is reset, and the 4096 SNs are reused in a quasi-unique manner.

The SN and the SN field 212 are used for a number of reasons, but generally, SNs are used to monitor and control the transmission of information units. For example, the SNs are used to monitor, prevent, and account for loss of information units. The transmitting station uses SNs to generally keep track of the information units (identified by their respective SNs) that have been transmitted to the receiving station, acknowledged by the receiving station, unacknowledged by the receiving station, and so on. This allows the transmitting station to retransmit a given information unit if receipt of that information unit (referenced by the information unit's SN) is not acknowledged within a predetermined period of time. Likewise, the receiving station uses the SNs to keep track of which information units have been received, the order in which the information units have been received, which information units to expect next, etc.

In some embodiments, the receiving station maintains a sliding receiving window that defines a set of information units (in terms of the SNs associated with the information units) that the receiving station will accept. Generally, the receiving window is characterized by a start position ("WinStart$_R$"), an end position ("WinEnd$_R$"), a maximum window size ("WinSize$_R$"), or a combination thereof. Generally, WinStart$_R$ is the lowest SN of an information unit that the receiving station will accept; WinEnd$_R$ is the highest SN of an information unit that the receiving station will accept; and WinSize$_R$ relates to the maximum number of information units that the receiving station will accept. Typically, WinSize$_R$=WinEnd$_R$−WinStart$_R$+1.

As information units are received at the receiving station, the receiving station acknowledges the receipt of the information units to the transmitting station and advances (or, more generally, adjusts) its receiving window in order to receive information units with higher SNs. Not receiving an information unit with a particular SN prevents the receiving station from advancing its receiving window until that information unit is received (possibly through a retransmission by the transmitting station). Therefore the SN field 212 of received information units is typically used by the receiving station to determine whether to adjust (e.g., advance) the receiving window.

Similarly, the transmitting station typically maintains a sliding transmitting window that defines a set of information units (in terms of the SNs of the information units) that the transmitting station will send. As transmitted information units are acknowledged by the receiving station (using the SNs of the transmitted information units), the transmitting station advances its transmitting windows and transmits more information units. However, unacknowledged information units will prevent the transmitting station from transmitting additional information units, and if an information unit is not acknowledged by the receiving station within a certain period of time, the transmitting station will retransmit the information unit. Accordingly, the set of SNs of the unacknowledged information units at the transmitting station is used by the transmitting station to determine whether to adjust (e.g., advance) the transmitting window.

Turning next to encryption, when the conventional unencrypted information unit 200 is encrypted using a conventional security mechanism such as CCMP (and the conventional encrypted information unit 250 is generated), the payload information 220 is encrypted into payload ciphertext 270, and a security header 260 is added that includes overhead information that is relevant to the encryption. Among other information, the security header 260 includes data that provides protection against replay attacks. A replay attack is a form of a network attack in which a valid data transmission is maliciously or fraudulently repeated or delayed, e.g., to flood the receiving station and cause denial of service (DoS). This is carried out, for example, by a rogue or faulty component on the transmitting station or by a rogue station in the network that, for instance, intercepts data and retransmits the data to the receiving station to cause a DoS on the receiving station.

To prevent a replay attack, the transmitting station generates a unique or quasi-unique nonce (abbreviation for "number used once") and associates the nonce with the conventional encrypted information unit 250. The nonce is generated based on a unique or quasi-unique 48-bit packet number (PN) associated with the conventional encrypted information unit 250, as well as on other information related to the conventional encrypted information unit 250, such as the priority of the traffic associated with the conventional encrypted information unit 250 and other factors described in the IEEE 802.11 standards. To provide an indication of the nonce to the receiving station, the transmitting station, during encryption, adds a PN field 265 to the security header of the encrypted information unit 250 that specifies the PN used for generating the nonce. When the receiving station receives the conventional encrypted information unit 250, the receiving station identifies the PN in the PN field 265 of the conventional encrypted information unit 250 and determines (based on the PN and/or the associated nonce) whether the same information unit has already been received in the past (or in recent past). If so, the receiving station discards the received conventional encrypted information unit 250 and raises an alert about a possible replay attack. Otherwise, the receiving station processes the received conventional encrypted information unit 250. In other words, the receiving station uses the PN in the PN field 265 to ensure that old communications cannot be reused in replay attacks.

It should be noted that, as illustrated in FIG. 2, the MAC header 210 and the security header 260 are separate and distinct, not only because information associated with the MAC header 210 is stored and transmitted separately from the information associated with the security header 260, but also because the MAC header 210 and the security header 250 are associated with different protocol layers. The security header 260, and more particularly the PN field 262, is associated with lower-layer MPDUs, whereas the rest of the information in the conventional encrypted information unit 250 (including the SN field 212) is associated with higher-level MSDUs.

Integrated Security Mechanisms

Figure 3:
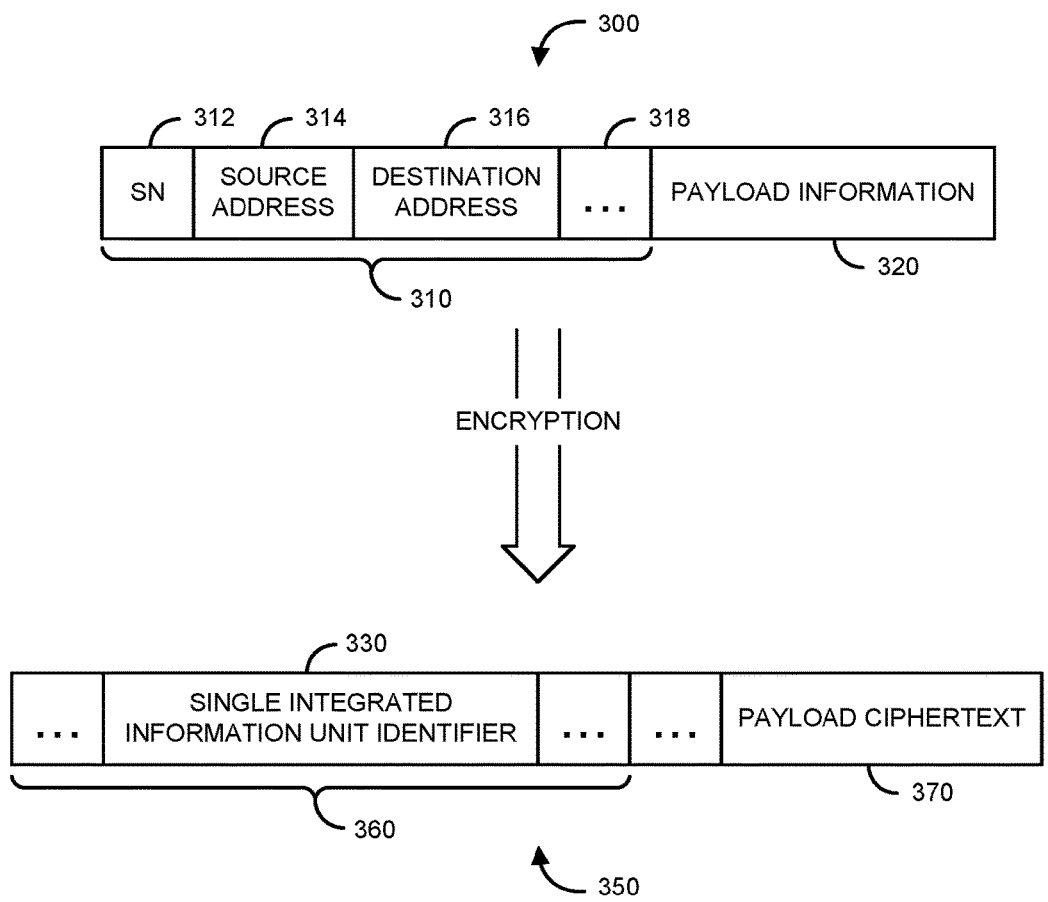
FIG. 3 is a block diagram illustrating a format of an unencrypted information unit and a format of an integrated encrypted information unit that results from encryption using an integrated security mechanism, according to an embodiment.

FIG. 3 is a block diagram of a format of an example unencrypted information unit 300 and a format of an integrated encrypted information unit 350 that results from encryption using an integrated security mechanism, according to an embodiment. Similar to the conventional unencrypted information unit 200 illustrated in FIG. 2, the unencrypted information unit 300 includes payload information 320 and a MAC header 310. The MAC header 310 of the unencrypted information unit 300 includes a source address 314 specifying a source (e.g., the transmitting station) of the unencrypted information unit 300, a destination address 316 specifying a destination (e.g., the receiving station) of the unencrypted information unit 300, and other information 318 that is described in detail in the IEEE 802.11 Standards, for example. Additionally, the MAC header 310 of the unencrypted information unit 200 includes a unique, or a quasi-unique sequence number (SN) field 312 that includes a sequence number (SN) that uniquely, or quasi-uniquely, identifies the unencrypted information unit 300.

According to an embodiment, when the unencrypted information unit 300 is encrypted using an integrated security mechanism, an integrated encrypted information unit 350 is generated. The integrated encrypted information unit 350 includes a payload ciphertext 370 that corresponds to the payload information 320 of the unencrypted information unit 300. Additionally, the integrated encrypted information unit 350 includes an integrated header 360 that includes information that is relevant to the encryption as well as information that is not related to encryption. The integrated header 360 of the integrated encrypted information unit 350 includes a single integrated information unit identifier 330 that can be used to both control transmission of the encrypted information unit 350 and to enable the receiving station to authenticate the encrypted information unit 350 and thus prevent a replay attack. In other words, the single integrated information unit identifier 330 can be used for transmission control purposes (e.g., to support error detection and/or correction, QoS, and so on) and for the purpose of providing, to the receiving station, an indication of the nonce used by the transmitting station to generate the integrated encrypted information unit 350. The single integrated information unit identifier 330 may be 12 bits, 32 bits, 48 bits, 64 bits, or any number of bits depending on the desired or required number of unique information unit identifiers. In an embodiment, the single integrated information unit identifier 330 is the SN in the SN field 312. In another embodiment, the single integrated information unit identifier 330 includes the SN in the SN field 312.

In some embodiments, or in some modes of operation, the integrated header 360 is used for additional purposes. For example, in one embodiment, the integrated header 360 includes information indicative of key identifiers, such as those described in the IEEE 802.11 Standards and that are included in the security header in conventional systems. Examples of information that is derived from the integrated header 360 in various embodiments include, but are not limited to, a Key ID, priority information, information related to traffic category (TC) or traffic stream (TS), etc.

As compared to conventional security mechanisms described above in reference to FIG. 2, there are various advantages, in some embodiments and/or implementations, associated with using the single integrated information unit identifier 330 for both transmission control purposes and security control purposes (e.g., for controlling the transmission of the integrated encrypted information unit 350 and for the purpose of providing an indication, to the receiving station, of the nonce used by the transmitting station to generate the encrypted information unit 350). For example, using the single integrated information unit identifier 330, as opposed to multiple fields (e.g., the SN field 212 and the PN field in 265 in FIG. 2), reduces overhead and increases the effective bandwidth, in some embodiments and/or implementations. Additionally, using a single integrated information unit identifier 330 leads to less data that needs to be processed by the receiving station, thus yielding more efficient processing, potentially resulting in fewer, smaller, and/or less expensive processing components, in some embodiments and/or implementations. Furthermore, using the single integrated information unit identifier 330 enables communication of overhead information related to transmission control and overhead information related to security in a single (and a higher) protocol layer, in some embodiments and/or implementations. As illustrated in FIG. 2, in conventional encrypted information units 250, overhead information related to transmission control in the MAC header 210 is associated with MSDUs (at a higher protocol layer) and overhead information related to security in the security header 260 is associated with MPDUs (at a lower protocol layer). By contrast, in the integrated encrypted information unit 350 illustrated in FIG. 3, overhead information related to transmission control and overhead information related to security are included in a single integrated header 360 that is associated with an MSDU, in an embodiment.

Figure 4:
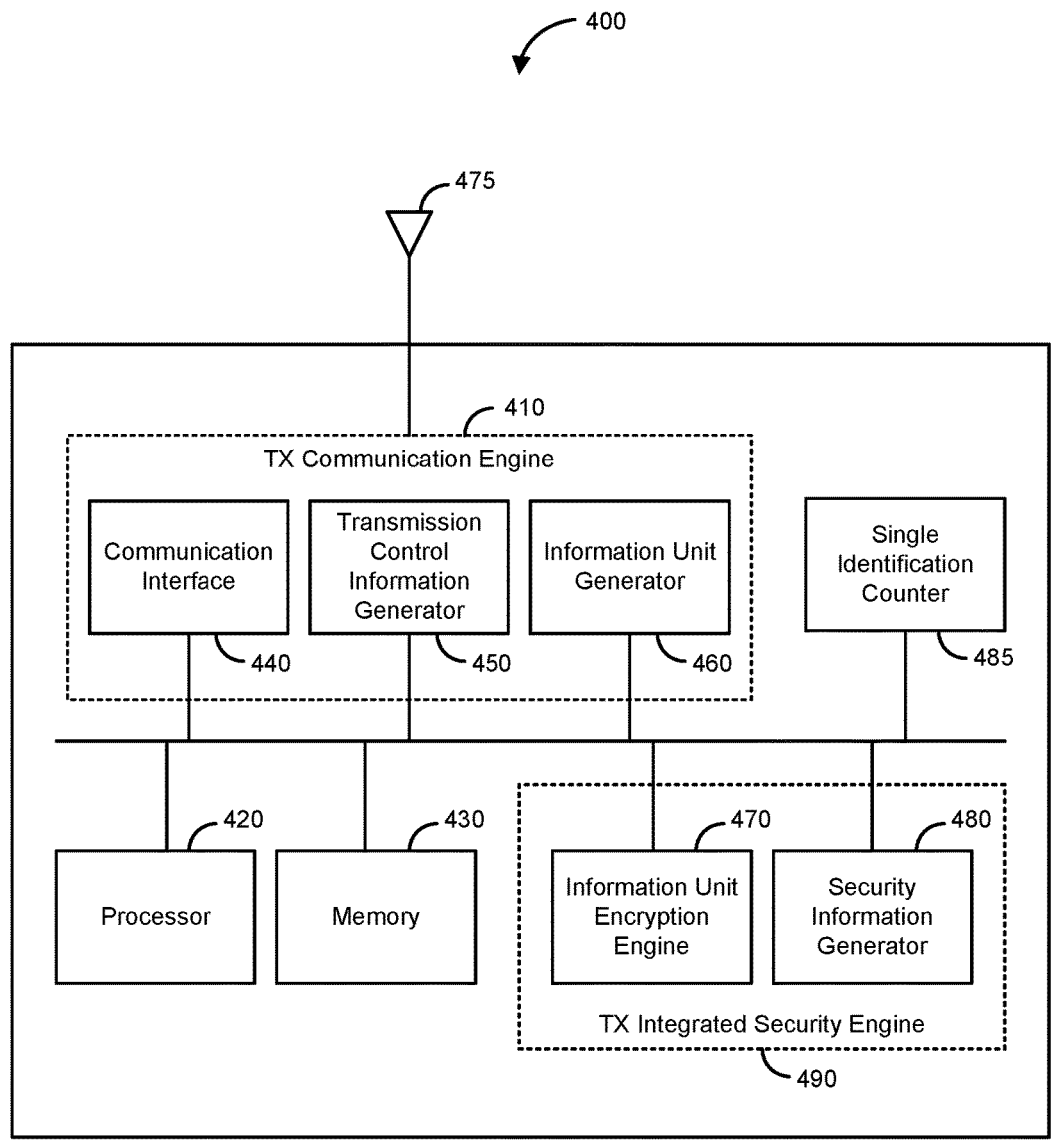
FIG. 4 is a block diagram of an example transmitting station that includes integrated security capabilities, according to an embodiment.

FIG. 4 is a block diagram of an example transmitting station 400 that includes integrated security capabilities, according to an embodiment. The example transmitting station 400 is utilized in the example communication system 100 of FIG. 1 as a transmitting station 110, in one embodiment. In other embodiments, the example transmitting station 400 is used in communication systems other than the communication system 100 illustrated in FIG. 1.

The example transmitting station 400 includes a TX communication engine 410 that includes an information unit generator 460 to form information into one or more information units and includes a communication interface 440 to transmit those information units to the receiving station (e.g., via one or more antennas 475). The TX communication engine 410 also includes a transmission control information generator 450 to provide overhead information related to transmission control of the information units, e.g., with respect to error detection and/or correction, QoS, and so on.

Additionally, the transmitting station 400 includes a TX integrated security engine 490 that provides the transmitting station 400 with integrated security capabilities. The TX integrated security engine 490 includes an information unit encryption engine 470 that encrypts information units (e.g., generated by the information unit generator 460), for example, as described in reference to FIG. 3. To encrypt information units, the information unit encryption engine 470 uses a security information generator 480 that adds overhead information related to the encryption (or, more generally, security-related overhead information) to the encrypted information unit).

Generally, the transmission control information generator 450 and the security information generator 480, together, provide a single integrated information unit identifier (such as the single integrated information unit identifier 330 of FIG. 3) that is used for both transmission control and security purposes, as explained in reference to FIG. 3. In some embodiments, the transmitting station 400 includes a single identification counter 485 to generate unique, or quasi-unique single integrated information unit identifiers, e.g., by monotonically increasing the single identification counter 485 for each single integrated information unit identifier. The single identification counter 485 is incremented to produce a unique or quasi-unique number, in an embodiment. The single identification counter 485 is a 12-bit, a 32-bit, a 48-bit, or a 64-bit counter, or another suitable counter based on the desired or required number of unique or quasi unique numbers.

In other embodiments, the transmitting station 400 does not include one or more of the components 410-490 or does not use each of the components 410-409 in facilitating integrated security mechanisms. Further, in some embodiments, some of the components 410-490 are combined, or divided into distinct components.

Figure 5:
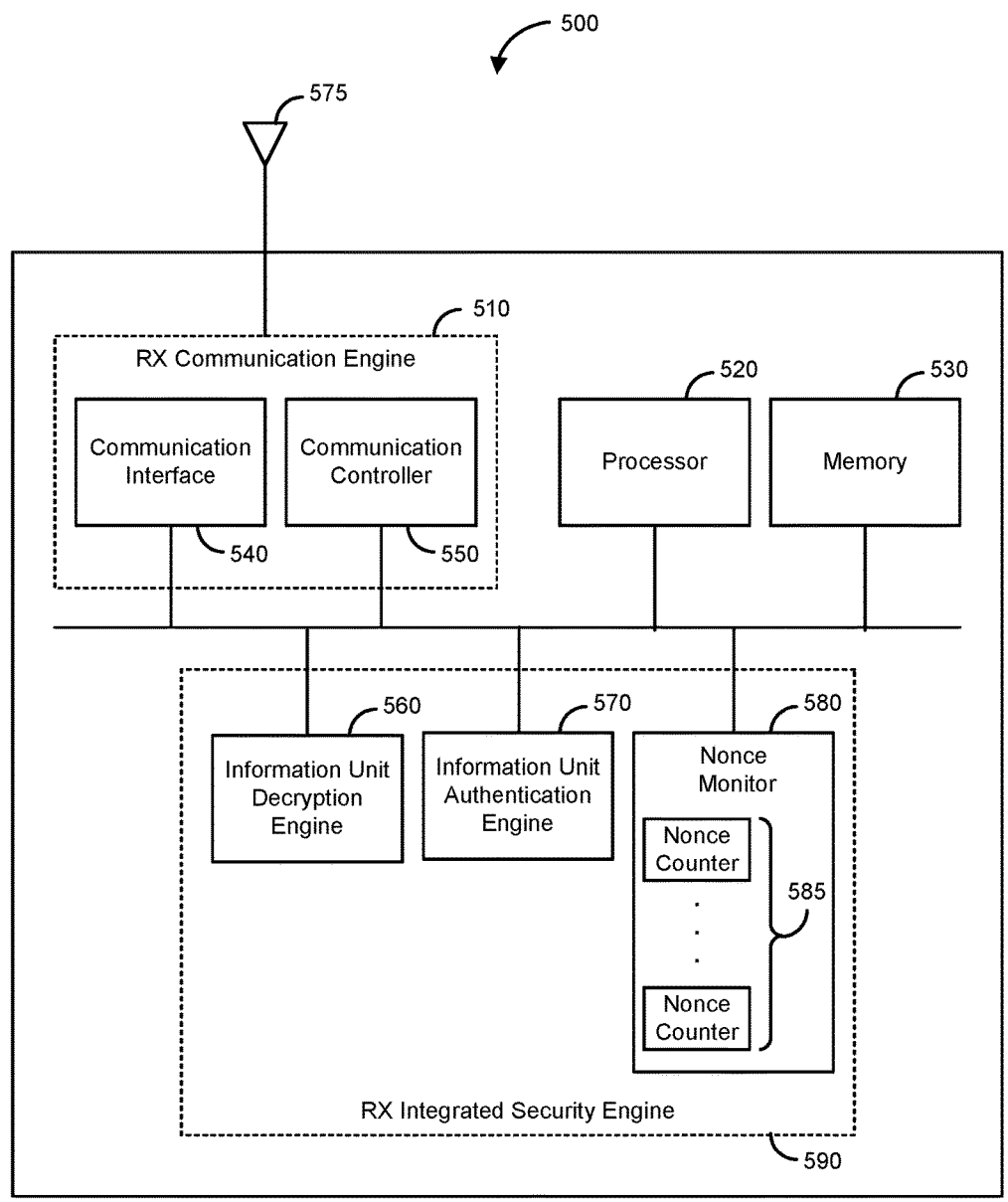
FIG. 5 is a block diagram of an example receiving station that includes integrated security capabilities, according to an embodiment.

FIG. 5 is a block diagram of an example receiving station 500 that includes integrated security capabilities, according to an embodiment. The example receiving station 500 is utilized in the example communication system 100 of FIG. 1 as a receiving station 120, in one embodiment. In other embodiments, the example receiving station 500 is used in communication systems other than the communication system 100 illustrated in FIG. 1.

The example receiving station 500 includes an RX communication engine 510 that includes a communication interface 540 to receive, e.g., via one or more antennas 575, encrypted information units. The RX communication engine 510 includes a communication controller 550 that generally controls the receipt of the encrypted information units (e.g., by acknowledging receipt of the encrypted information units to the transmitting station, adjusting the receive window to control which information units the receiving station 500 may accepts, and so on).

Additionally, the receiving station 500 includes an RX integrated security engine 590 that provides the receiving station 500 with integrated security capabilities. The RX integrated security engine 590 includes an information unit authentication engine 560 that authenticates the received encrypted information units and an information unit decryption engine 560 the decrypts the authenticated information units for further processing by the receiving station 500.

As explained above in reference to FIG. 3, the received encrypted information units include a single integrated information unit identifier (such as the single integrated information unit identifier 330 of FIG. 3) that is used by the communication controller 550 to control the receipt of the information units and that is used by the information unit authentication engine 570 to authenticate the information unit. More specifically, regarding controlling the receipt of information units, the communication controller 550 uses the single integrated information unit identifier of a given received encrypted information unit to acknowledge receipt of that information unit to the transmitting station (e.g., by sending, to the transmitting station, an acknowledgment referencing the single integrated information unit identifier associated with the information unit). With respect to authentication, the information unit authentication engine 570 uses the single integrated information unit identifier to determine the nonce used by the transmitting station to encrypt the information unit. Once the nonce is determined, the information unit authentication engine 570 establishes whether the determined nonce has already been received in the past. If so, this may indicate that the received encrypted information unit including the duplicate nonce is part of a replay attack, and the information unit authentication engine 570 thus discards the information unit. Otherwise, the information unit authentication engine 570 provides the information unit to the information unit decryption engine 560 for decryption of the information unit for further processing by the receiving station 500, in an embodiment.

In order to determine whether the nonce has already been received in the past, the RX integrated security engine 590 includes a nonce monitor 580 to keep track of the nonces that have been used in the past. In some embodiments, the nonce monitor 580 includes one our more nonce counters 585 that are incremented as encrypted information units with new nonces are received. For example, the nonce monitor 580 includes one or more nonce counters 585 for each Pairwise Transient Key Security Association (PTKSA), Group Transient Key Security Association (GTKSA), Station-To-Station Link Transient Key Security Association (STKSA), transmitting station's priority queue, etc., in various embodiments In some embodiments, or in some modes of operation, the nonce monitor 580 includes fewer nonce counters 585 than priority queues, in which case multiple traffic streams, traffic categories, etc. are mapped to a single nonce counter (possibly sacrificing priority capabilities). In some embodiments, this mapping is different in different transmitting stations and/or receiving stations. In an embodiment, a given receiving station communicates its preferred mapping to a transmitting station. Then, the transmitting station conforms to the receiving station's preferred mapping. In another embodiment, the transmitting station configures the mapping based on traffic conditions at the transmitting station and communicate the configured mapping to the receiving station. In another embodiment, the transmitting station and the receiving station negotiate the mapping, e.g., by using explicit management messages. In some embodiments, the receiving station communicates to the transmitting station information indicative of the number of nonce counters 585 that the receiving station has, and the transmitting station uses the number of nonce counters 585 (along other information, in some cases) to configured the mapping.

In other embodiments, the receiving station 500 does not include one or more of the components 510-590 or does not use each of the components 510-590 in facilitating integrated security mechanisms. Further, in some embodiments, some of the components 510-590 are combined, or divided into distinct components.

Figure 6:
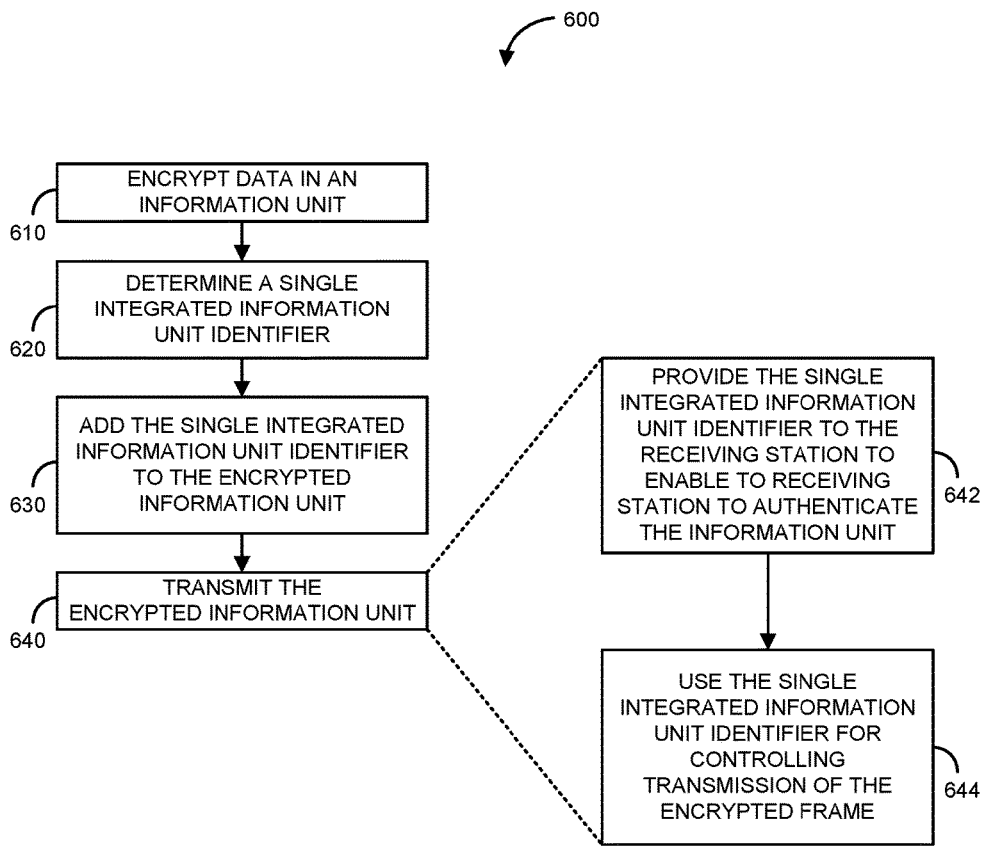
FIG. 6 is a flow diagram of an example integrated security method that can be performed at a transmitting station, according to an embodiment.

FIG. 6 is a flow diagram of an example integrated security method 600 that is performed at a transmitting station, such as the transmitting station 400 of FIG. 4, according to an embodiment. For ease of explanation, FIG. 6 will be described with reference to FIGS. 1 and 3-5. In other embodiments, however, the example integrated security method 600 is utilized with systems, devices and information units other than those illustrated in FIGS. 1 and 3-5.

As explained in reference to FIG. 4, the transmitting station 400 uses the information unit encryption engine 470 to encrypt data in an unencrypted information unit to generate an encrypted information unit (block 610). The transmitting station further uses the security information generator 480, the transmission control information generator 450 and the single identification counter 485 to determine a single integrated information unit identifier for the encrypted information unit (block 620). Once the single integrated information unit identifier is determined, the transmitting station 400 adds the single integrated information unit identifier to the encrypted information unit (block 630). The transmitting station 400 then transmits the encrypted information unit to a receiving station (block 640).

In transmitting the encrypted information unit, the transmitting station provides the single integrated information unit identifier to the receiving station, enabling the receiving station to decrypt the encrypted information unit (block 642). For example, the receiving station uses the single integrated information unit identifier to determine a nonce used in encryption, in an embodiment. Once the nonce is determined, the receiving station establishes whether the same nonce has been used in the past and, if so, discards the received encrypted information unit. Otherwise, the receiving station processes the received encrypted information unit.

Additionally, in transmitting the encrypted information unit, the transmitting station 400 uses the single integrated information unit identifier for controlling transmission of the encrypted information unit, where controlling the transmission of the encrypted information unit is not related to encryption (block 644). For example, the transmitting station uses the single integrated information unit to monitor, detect, and account for data loss, to provide QoS, etc., according to some embodiments.

Figure 7:
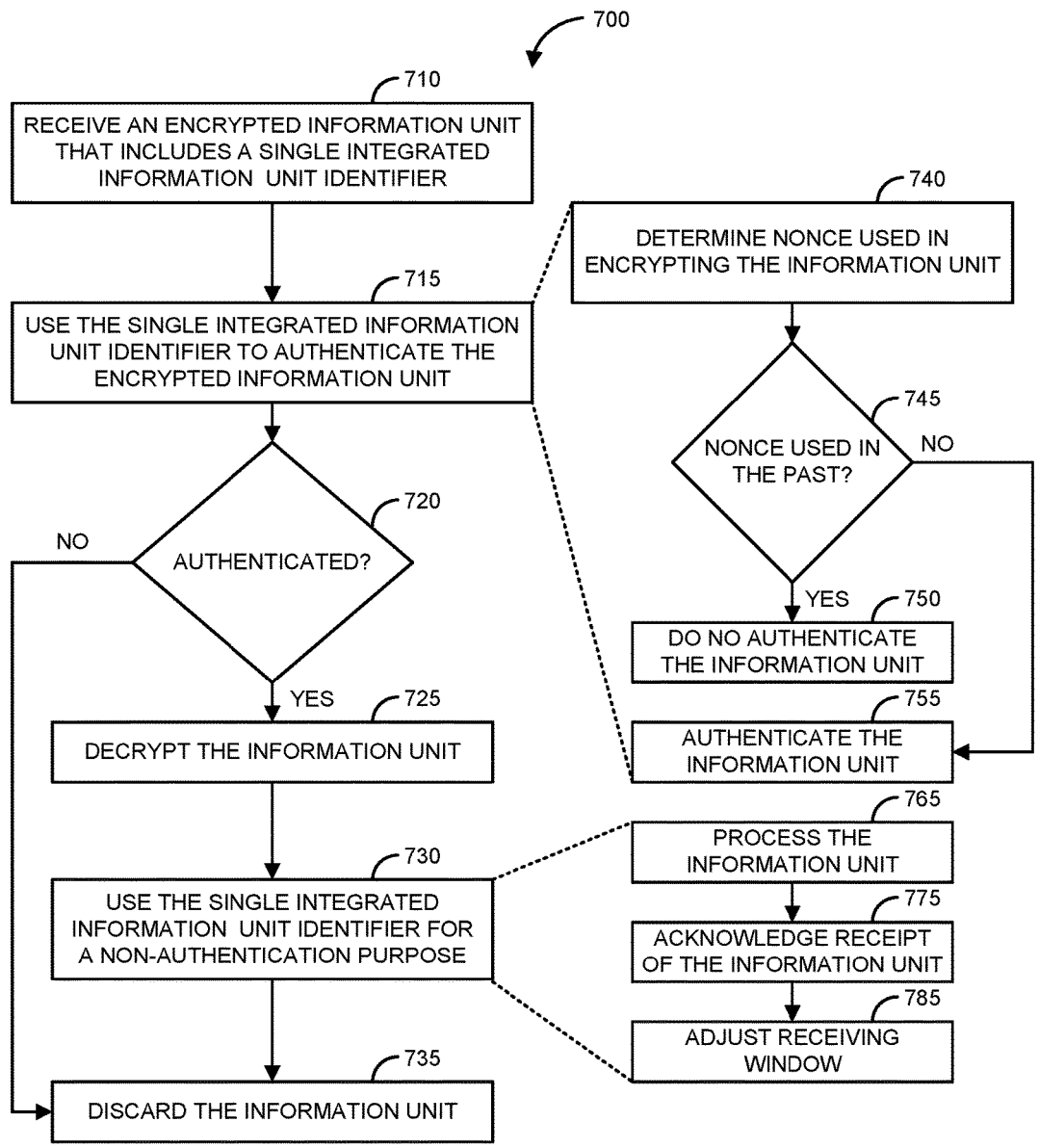
FIG. 7 is a flow diagram of an example integrated security method that can be performed at a receiving station, according to an embodiment.

FIG. 7 is a flow diagram of an example integrated security method 700 that is performed at a receiving station, such as the receiving station 500 of FIG. 5, according to an embodiment. For ease of explanation, FIG. 7 will be described with reference to FIGS. 1 and 3-5. In other embodiments, however, the example integrated security method 700 is utilized with systems, devices and information units other than those illustrated in FIGS. 1 and 3-5.

As explained in reference to FIG. 5, a receiving station 500 receives an encrypted information unit that includes a single integrated information unit identifier, such as the single integrated information unit identifier 330 of FIG. 3 (block 710). After receiving the encrypted information unit, the receiving station 500 uses the single integrated information unit identifier to authenticate the received encrypted information unit (block 715). For example, the receiving station 500 uses the single integrated information unit identifier to determine the nonce used in encrypting the information unit (block 740) and establishes whether the nonce has been used in the past (block 745). If the nonce has been used in the past ("YES" branch of block 745), the receiving station 500 does not authenticate the received information unit (block 750). Otherwise ("NO" branch of block 745), the receiving station 500 authenticates the received information unit (block 755).

If the receiving station 500 authenticates the received information unit ("YES" branch of block 720), the receiving station 500 decrypts that information unit (block 725). Furthermore, the receiving station 500 uses the single integrated information unit identifier in the received encrypted information unit for a non-authentication purpose that is not related to encryption, as described above (block 730). That is, the receiving stations uses the single integrated information unit identifier to generally process the information unit (block 765), acknowledge receipt of the information unit (block 775), adjust the receiving window, and so on (block 785).

Figure 8:
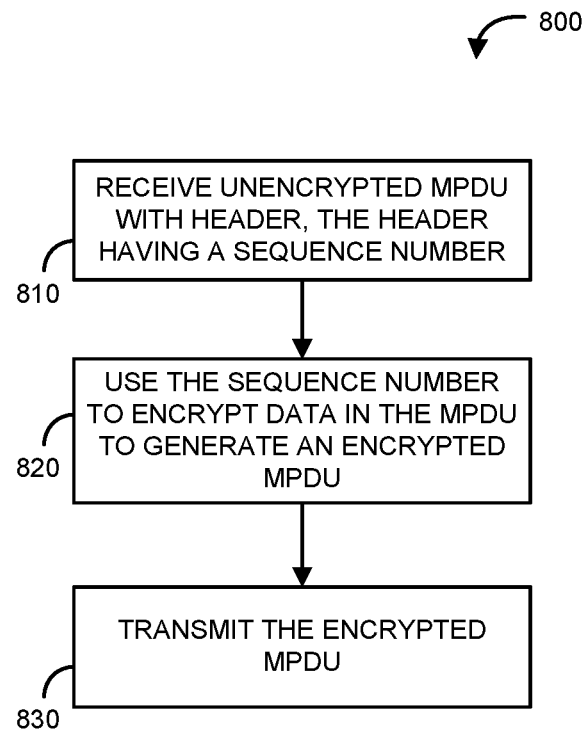
FIG. 8 is a flow diagram of an example method for secure communications in a network, according to an embodiment.

FIG. 8 is a flow diagram of an example method 800 that is performed at a network interface of a transmitting station, according to an embodiment.

A wireless network interface device receives an unencrypted media access control layer (MAC) protocol data unit (MPDU) (block 810). The MPDU received at block 810 includes a header, the header having a sequence number.

The wireless network interface device uses the sequence number to encrypt data in the unencrypted MPDU to generate an encrypted MPDU (block 820). For example, in an embodiment, the wireless network interface device uses the sequence number to generate a nonce, and then uses the nonce to encrypt data in the unencrypted MPDU.

The wireless network interface device then transmits the encrypted MPDU (block 830).

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in on any computer readable memory medium (e.g., memory 430 and 530 illustrated in FIG. 4 and FIG. 5, respectively), such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

What is claimed is:

1. A method, comprising:
   receiving, at a wireless network interface device, an unencrypted media access control layer (MAC) protocol data unit (MPDU) having a header, wherein the header includes a sequence number;
   using, at the wireless network interface device, the sequence number to encrypt data in the unencrypted MPDU to generate an encrypted MPDU, wherein the encrypted MPDU is generated to include only a single field that contains the sequence number, wherein the sequence number of the single field of the encrypted MPDU is located in the header of the encrypted MPDU and is to be used by a receiving device to a) acknowledge, to the wireless network interface device, reception of the MPDU by the receiving device, and b) decrypt the MPDU; and
   transmitting, with the wireless network interface device, the encrypted MPDU.

2. The method of claim 1, wherein using the sequence number to encrypt data in the unencrypted MPDU comprises:
   using the sequence number in the header of the unencrypted MPDU to generate a nonce; and
   using the nonce to encrypt data in the unencrypted MPDU to generate the encrypted MPDU.

3. An apparatus, comprising:
   circuitry configured to
      receive an unencrypted media access control layer (MAC) protocol data unit (MPDU) having a header, wherein the header includes a sequence number,
      use the sequence number to encrypt data in the unencrypted MPDU to generate an encrypted MPDU, wherein the encrypted MPDU is generated to include only a single field that contains the sequence number, wherein the sequence number of the single field of the encrypted MPDU is located in the header of the encrypted MPDU and is to be used by a receiving device to a) acknowledge, to a wireless network interface device that includes the circuitry, reception of the MPDU by the receiving device, and b) decrypt the MPDU, and
      cause the wireless network interface device to transmit the encrypted MPDU.

4. The apparatus of claim 3, wherein the circuitry is configured to:
   use the sequence number in the header of the unencrypted MPDU to generate a nonce, and
   use the nonce to encrypt data in the unencrypted MPDU to generate the encrypted MPDU.

5. A method, comprising:
   receiving, at a wireless network interface device, an unencrypted media access control layer (MAC) protocol data unit (MPDU) having a header, wherein the header includes a sequence number;
   using, at the wireless network interface device, the sequence number to encrypt data in the unencrypted MPDU to generate an encrypted MPDU, wherein the encrypted MPDU is generated to include only a single sequence number field having the sequence number of the unencrypted MPDU, wherein the sequence number field in the header of the encrypted MPDU is to be used by a receiving device to a) acknowledge, to the wireless network interface device, reception of the MPDU by the receiving device, and b) decrypt the MPDU; and
   transmitting, with the wireless network interface device, the encrypted MPDU.

* * * * *